United States Patent [19]
Shyu

[11] Patent Number: 6,075,573
[45] Date of Patent: Jun. 13, 2000

[54] METHOD AND APPARATUS FOR CONVERTING LUMINANCE-CHROMINANCE COLOR SPACE SIGNALS TO RGB COLOR SPACE SIGNALS USING SHARED PREDICTIVE AND COMPENSATIVE TRANSFORMATION CODES FOR CHROMINANCE COMPONENTS

[75] Inventor: Rong-Fuh Shyu, Hsinchu, Taiwan

[73] Assignee: Winbond Electronics Corp., Hsinchu, Taiwan

[21] Appl. No.: 09/007,205

[22] Filed: Jan. 14, 1998

Related U.S. Application Data

[63] Continuation-in-part of application No. 08/872,360, Jun. 10, 1997, Pat. No. 5,963,263.

[51] Int. Cl.[7] .................................................. H04N 9/67
[52] U.S. Cl. .......................... 348/661; 348/659; 345/154
[58] Field of Search .................... 348/659, 660, 348/661, 453; 345/154, 153, 155, 199; 358/518, 523; H04N 9/67

[56] References Cited

U.S. PATENT DOCUMENTS

| | | | |
|---|---|---|---|
| 4,507,676 | 3/1985 | Dischert et al. ............................ | 358/30 |
| 5,124,688 | 6/1992 | Rumball .................................. | 340/703 |
| 5,726,682 | 3/1998 | Lum et al. ............................... | 348/661 |
| 5,760,762 | 6/1998 | Yamamoto ............................... | 345/154 |
| 5,872,556 | 2/1999 | Rackley et al. .......................... | 345/154 |
| 5,936,683 | 8/1999 | Lin ......................................... | 348/659 |
| 5,963,263 | 10/1999 | Shyu ...................................... | 348/453 |
| 5,999,164 | 12/1999 | Ito ......................................... | 348/661 |

*Primary Examiner*—Michael H. Lee
*Attorney, Agent, or Firm*—Christie, Parker & Hale, LLP

[57] ABSTRACT

In a method and apparatus for converting digitized luminance-chrominance color space signals to digitized RGB color space signals, starting chrominance-in-color terms of a standard set of conversion equations are expanded into linear combinations of expanded chrominance-in-color terms that involve only predictive and compensative coefficients. Predictive and compensative code generators respectively generate predictive and compensative transformation codes that correspond to a first one of the chrominance color space signals during a first timing phase and that correspond to a second one of the chrominance color space signals during a second timing phase. The predictive and compensative transformation codes from the predictive and compensative code generators are transformation values for the expanded chrominance-in-color terms and are linearly combined to obtain transformation values for the starting chrominance-in-color terms. Finally, the transformation values for the starting chrominance-in-color terms are combined with the luminance color space signal according to the standard set of conversion equations to obtain the RGB color space signals.

22 Claims, 6 Drawing Sheets

METHOD AND APPARATUS FOR CONVERTING LUMINANCE-CHROMINANCE COLOR SPACE SIGNALS TO RGB COLOR SPACE SIGNALS USING SHARED PREDICTIVE AND COMPENSATIVE TRANSFORMATION CODES FOR CHROMINANCE COMPONENTS

CROSS-REFERENCE TO RELATED APPLICATION

This application is a continuation-in-part (CIP) of U.S. patent application Ser. No. 08/872,360, filed on Jun. 10, 1997, now U.S. Pat. No. 5,963,263.

BACKGROUND OF THE INVENTION

1. Field of the Invention

The invention relates to a method and apparatus for performing color space conversion, more particularly to a method and apparatus for converting digitized luminance-chrominance color space signals to digitized RGB color space signals which utilize shared predictive and compensative transformation codes for chrominance components.

2. Description of the Related Art

It is desirable to merge a video signal with graphic signals in a multi-media computer system. The video signal may come from a television image processing system having a capture or frame grabbing capability, or from a compressed video playback of a CD-ROM, DVD (digital versatile disc) or network transmission. Color space conversion is needed in image processing applications to convert luminance-chrominance color space signals, which offer the advantages of a lower transmission bandwidth and a lower data storage requirement, into RGB color space signals, which are used when displaying an image on a computer monitor.

In digital video applications, it is not uncommon to represent colors of pixel data in YCbCr 4:2:2 spatial resolution format. This means that the chrominance components Cb and Cr of the pixel data are in half resolution relative to the luminance component Y in a horizontal direction of the image since the human visual system is less sensitive to chrominance than luminance. The chrominance components Cb and Cr can be further decimated to YCbCr 4:2:0 or 4:1:1 format that further reduces the spatial resolution by half in a vertical direction of the image in case a compression algorithm is incorporated in the digital video application, such as MPEG, JPEG, etc. As such, both chrominance components Cb and Cr are usually presented alternately with the corresponding luminance component Y. This permits a sharing of resources for manipulating both chrominance components Cb and Cr to consequently reduce the required processing means in the color space conversion.

CCIR 601, which was proposed by the Comite Consultatif International des Radiocommunications (CCIR), establishes the following equations for converting from the YCbCr luminance-chrominance color space to the RGB color space:

$$R = Y + 1.402\,(Cr\text{-}128) \quad\quad (a.1)$$
$$G = Y - 0.714\,(Cr\text{-}128) - 0.344\,(Cb\text{-}128) \quad\quad (a.2)$$
$$B = Y + 1.772\,(Cb\text{-}128) \quad\quad (a.3)$$

If U and V are used to represent the shifted chrominance components (Cb-128) and (Cr-128), respectively, the standard set of equations (a.1) to (a.3) can be rewritten as follows:

$$R = Y + 1.402V \quad\quad (b.1)$$
$$G = Y - 0.714V - 0.344U \quad\quad (b.2)$$
$$B = Y + 1.772U \quad\quad (b.3)$$

where Y ranges between [0, 255], and U and V range between [−128, 127] in an 8-bit representation for each of the Y, Cb and Cr color space components.

Color space conversion is often implemented by employing multipliers or look-up tables to achieve the matrix multiplication operations. Look-up tables are preferred because of their less complicated constructions. It is noted that the matrix multiplication operations dominate the hardware complexity of a color space converting apparatus. As such, the number of look-up tables is critical in determining the cost of implementing the color space converting apparatus. To implement the YCbCr to RGB color space conversion of equations (a.1) to (a.3), a conventional color space converter usually requires four look-up tables to perform the matrix multiplication of chrominance components. Although the use of four look-up tables is less expensive to implement as compared to another conventional color space converter which uses a 3-by-3 multiplication matrix, a further reduction in the cost of implementing the matrix multiplication of chrominance components is desirable.

In co-pending U.S. patent application Ser. No. 08/872,360, entitled "Method And Apparatus Requiring Fewer Number of Look-Up Tables For Converting Luminance Chrominance Color Space Signals To RGB Color Space Signals," and filed on Jun. 10, 1997 by the Applicant, it has been proposed that, by linearly combining the conversion formulas, equations (b.1) to (b.3) can be rearranged as follows to result in RGB color combination signals:

$$R-G = 0.714\,(2V) + 0.344\,(U+2V) \quad\quad (c.1)$$
$$B-G = 0.714\,(2U+V) + 0.344\,(2U) \quad\quad (c.2)$$
$$R+B-G = Y + 0.714\,(2U+2V) + 0.344\,(2U+2V) \quad\quad (c.3)$$
$$B+G = 2Y + 0.714\,(2U-V) \quad\quad (c.4)$$
$$R+G = 2Y + 0.344\,(2V-U) \quad\quad (c.5)$$

Equations (c.1) to (c.5) list a set of possible linear combinations of equations (b.1) to (b.3). Consequently, as equations (c.1) to (c.5) use only two coefficients, namely 0.714 and 0.344, for matrix multiplications, no more than two look-up tables may be used to convert luminance-chrominance color space signals to RGB color combination signals. Therefore, conversion from the luminance-chrominance color space to the RGB color space can be implemented using fewer than four look-up tables by converting the luminance-chrominance color space signals to the RGB color combination signals expressed as a function of predetermined linear combinations of the chrominance color space signals as defined by the appropriate conversion formulas, and by linearly combining the resulting RGB color combination signals to obtain the RGB color space signals.

The apparatus disclosed in the aforementioned U.S. Patent Application comprises: a first combining unit for generating a plurality of linear combinations of the chrominance color space signals and at least one binary combination of the luminance color space signal; a multiplexed multiplication unit connected to the first combining unit to receive the linear combinations of the chrominance color space signals therefrom, the multiplexed multiplication unit including no more than two look-up tables which contain digitized transformation values for performing matrix multiplications of the linear combinations of the chrominance color space signals; a second combining unit connected to the multiplexed multiplication unit and the first combining unit, the second combining unit linearly combining the digitized transformation values outputted by the multiplexed multiplication unit and the binary combination of the luminance color space signal to generate three RGB color combination signals; and a third combining unit connected to the second combining unit, the third combining unit linearly combining the RGB color combination signals to obtain the RGB color space signals.

SUMMARY OF THE INVENTION

The object of the present invention is to provide a cost-effective color space converting method and apparatus for converting digitized luminance-chrominance color space signals to digitized RGB color space signals by using shared predictive and compensative transformation codes for both chrominance components.

According to one aspect of the present invention, a method for converting digitized luminance-chrominance color space signals to digitized RGB color space signals is based on a standard set of conversion equations that involve four starting chrominance-in-color terms, and comprises the step of expanding the starting chrominance-in-color terms into linear combinations of expanded chrominance-in-color terms that involve only predictive and compensative coefficients. A predictive code generator for generating predictive transformation codes that correspond to a first one of the chrominance color space signals during a first timing phase and that correspond to a second one of the chrominance color space signals during a second timing phase, and a compensative code generator for generating compensative transformation codes that correspond to the first one of the chrominance color space signals during the first timing phase and that correspond to the second one of the chrominance color space signals during the second timing phase are provided. The predictive and compensative transformation codes from the predictive and compensative code generators are transformation values for the expanded chrominance-in-color terms, and are linearly combined to obtain transformation values for the starting chrominance-in-color terms. The transformation values for the starting chrominance-in-color terms are combined with the luminance color space signal according to the standard set of conversion equations to obtain the RGB color space signals.

According to another aspect of the present invention, an apparatus for converting digitized luminance-chrominance color space signals to digitized RGB color space signals performs color space conversion based on a standard set of conversion equations which involve four starting chrominance-in-color terms that are expanded into linear combinations of expanded chrominance-in-color terms involving only predictive and compensative coefficients. The apparatus comprises predictive and compensative code generators, linear combining means and output combining means. The predictive code generator generates predictive transformation codes that correspond to a first one of the chrominance color space signals during a first timing phase and that correspond to a second one of the chrominance color space signals during a second timing phase. The compensative code generator generates compensative transformation codes that correspond to the first one of the chrominance color space signals during the first timing phase and that correspond to the second one of the chrominance color space signals during the second timing phase. The predictive and compensative transformation codes are transformation values for the expanded chrominance-in-color terms. The linear combining means is connected to the predictive and compensative code generators and linearly combines the predictive and compensative transformation codes from the predictive and compensative code generators to obtain transformation values for the starting chrominance-in-color terms. The output combining means is connected to the linear combining means and combines the transformation values for the starting chrominance-in-color terms with the luminance color space signal according to the standard set of conversion equations to obtain the RGB color space signals.

In the preferred embodiments, at least one of the predictive and compensative code generators is implemented as a look-up table unit. Preferably, the predictive and compensative code generators are jointly implemented in a single look-up table unit.

BRIEF DESCRIPTION OF THE DRAWINGS

Other features and advantages of the present invention will become apparent in the following detailed description of the preferred embodiments with reference to the accompanying drawings, of which.

DETAILED DESCRIPTION OF THE PREFERRED EMBODIMENTS

Before the present invention is described in greater detail, it should be noted that like elements are denoted by the same reference numerals throughout the disclosure.

Figure 1:
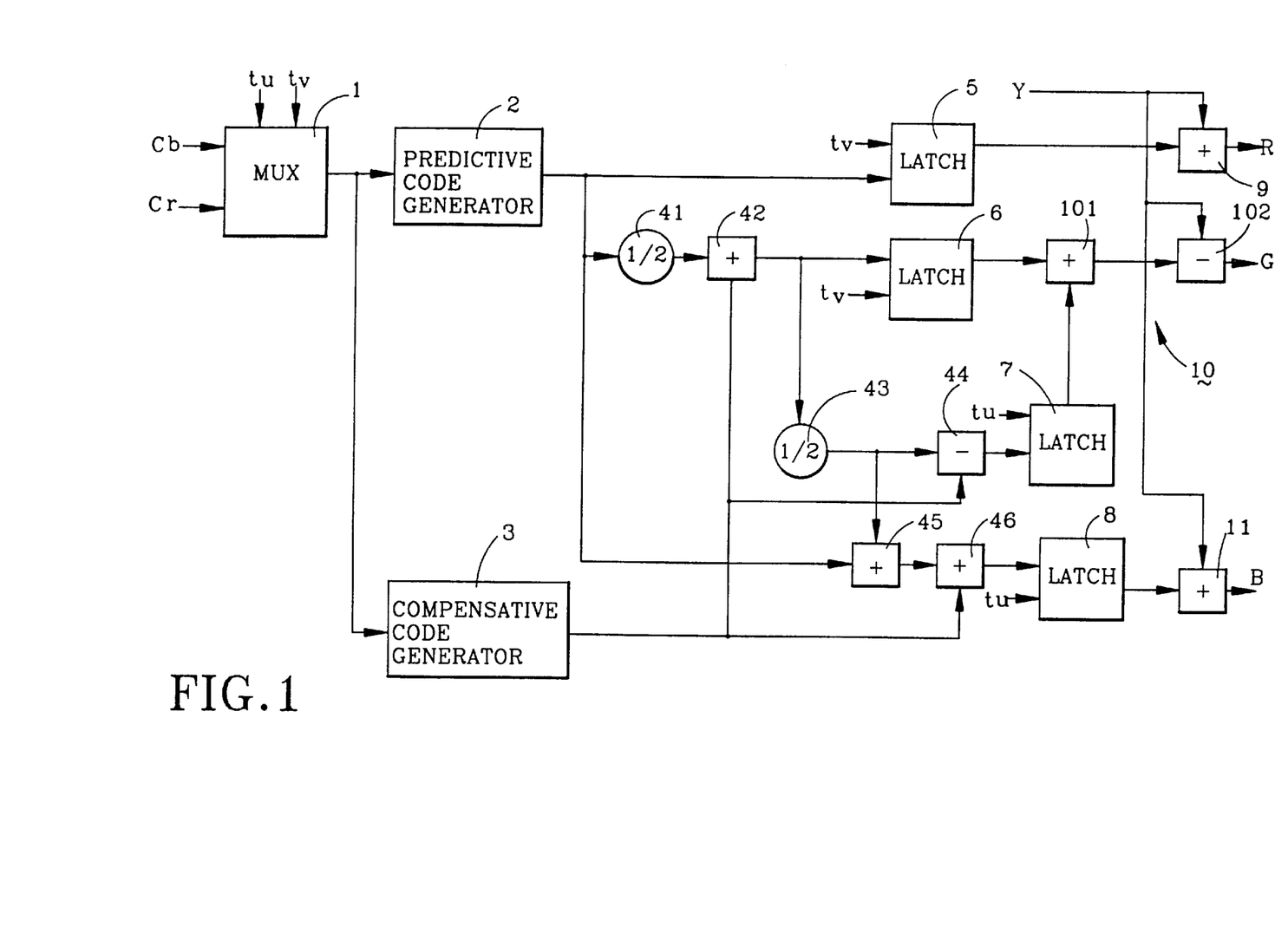
FIG. 1 is a functional block diagram of the first preferred embodiment of a color space converting apparatus according to the present invention.

Referring to FIG. 1, the first preferred embodiment of a color space converting apparatus for converting digitized YCbCr luminance-chrominance color space signals to digitized RGB color space signals in accordance with this invention is shown to comprise a multiplexer 1, a predictive code generator 2, a compensative code generator 3, a linear combining unit which includes a plurality of shifters, adders and subtracters 41, 42, 43, 44, 45, 46, first to fourth latches 5, 6, 7, 8, and first to third output combining units 9, 10, 11.

The multiplexer 1 receives digitized input chrominance color space signals Cb and Cr and outputs a selected one of the chrominance color space signals Cb and Cr in response to timing select signals tu and tv. The selected chrominance color space signal from the multiplexer 1 is directed to the predictive code generator 2 and the compensative code generator 3 to generate predictive and compensative transformation codes for the selected chrominance color space signal.

In this embodiment, the predictive transformation codes are formulated as 1.402 (C-128), while the compensative transformation codes are formulated as 0.013 (C-128), where C represents the Cb chrominance color space signal during tu timing phases, and the Cr chrominance color space signal during tv timing phases. In case that U and V are employed instead of Cb and Cr as the input chrominance color space signals, the formulas for the predictive and compensative transformation codes become 1.402C and 0.013C, respectively, where C represents the U chrominance color space signal during tu timing phases, and the V chrominance color space signal during tv timing phases.

As mentioned beforehand, the standard set of conversion equations (a.1) to (a.3) involves four starting chrominance-in-color terms, namely 1.402 (Cr-128), 0.714 (Cr-128), 0.344 (Cb-128) and 1.772 (Cb-128). In the present invention, the standard set of conversion equations (a.1) to (a.3) is rewritten by expanding the starting chrominance-in-color terms into linear combinations of expanded chrominance-in-color terms that involve only predictive and compensative coefficients.

In the present embodiment, the starting chrominance-in-color term 1.402 (Cr-128) need not be expanded since the coefficient thereof is already equal to the predictive coefficient. Since the coefficients of the starting chrominance-in-color terms 0.714 (Cr-128), 0.344 (Cb-128) and 1.772 (Cb-128) are not equal to the predictive or compensative coefficients, they can be expanded as follows: 0.714 (Cr-128)=½ (1.402) (Cr-128)+0.013 (Cr-128) 0.344 (Cb-128)=½ [½(1.402) (Cb-128)+0.013 (Cb-128)]−0.013 (Cb-128) 1.772 (Cb-128)=1.402 (Cb-128)+½[½(1.402 ) (Cb-128)+0.013 (Cb-128)]+0.013 (Cb-128)

The linear combining unit is used to linearly combine the predictive and compensative transformation codes from the predictive and compensative code generators 2, 3 according to the preceding expansion equations to obtain the transformation values for the starting chrominance-in-color terms in the standard set of conversion equations (a.1) to (a.3).

The shifter 41 performs an arithmetic right shift on the predictive transformation code from the predictive code generator 2 to achieve the function of dividing the predictive transformation code by two. The adder 42 adds the output of the shifter 41 to the compensative transformation code from the compensative code generator 3 to obtain the transformation value for the starting chrominance-in-color term 0.714 (Cr-128) during the tv timing phases.

The shifter 43 performs an arithmetic right shift on the 0.714 (C-128) output of the adder 42. The subtracter 44 subtracts the compensative transformation code from the output of the shifter 43 to obtain the transformation value for the starting chrominance-in-color term 0.344 (Cb-128) during the tu timing phases.

The adder 45 adds the 0.357 (C-128) output of the shifter 43 to the predictive transformation code from the predictive code generator 2. The adder 46 adds the compensative transformation code from the compensative code generator 3 to the output of the adder 45 to obtain the transformation value for the starting chrominance-in-color term 1.772 (Cb-128) during the tu timing phases.

The first latch 5 latches the predictive transformation code from the predictive code generator 2 during the tv timing phases to obtain the desired Cr-in-R transformation value, i.e. 1.402 (Cr-128). The second latch 6 latches the output of the adder 42 during the tv timing phases to obtain the desired Cr-in-G transformation value, i.e. 0.714 (Cr-128). The third latch 7 latches the output of the subtracter 44 during the tu timing phases to obtain the desired Cb-in-G transformation value, i.e. 0.344 (Cb-128). The fourth latch 8 latches the output of the adder 46 during the tu timing phases to obtain the desired Cb-in-B transformation value, i.e. 1.772 (Cb-128).

The first output combining unit 9 includes an adder for adding the output of the first latch 5 to the digitized Y luminance signal in order to obtain the R color space signal.

The second output combining unit 10 includes an adder 101 for adding the outputs of the second and third latches 6, 7 and a subtracter 102 for deducting the output of the adder 101 from the digitized Y luminance signal in order to obtain the G color space signal.

The third output combining unit 11 includes an adder for adding the output of the fourth latch 8 and the digitized Y luminance signal in order to obtain the B color space signal.

Figure 2:
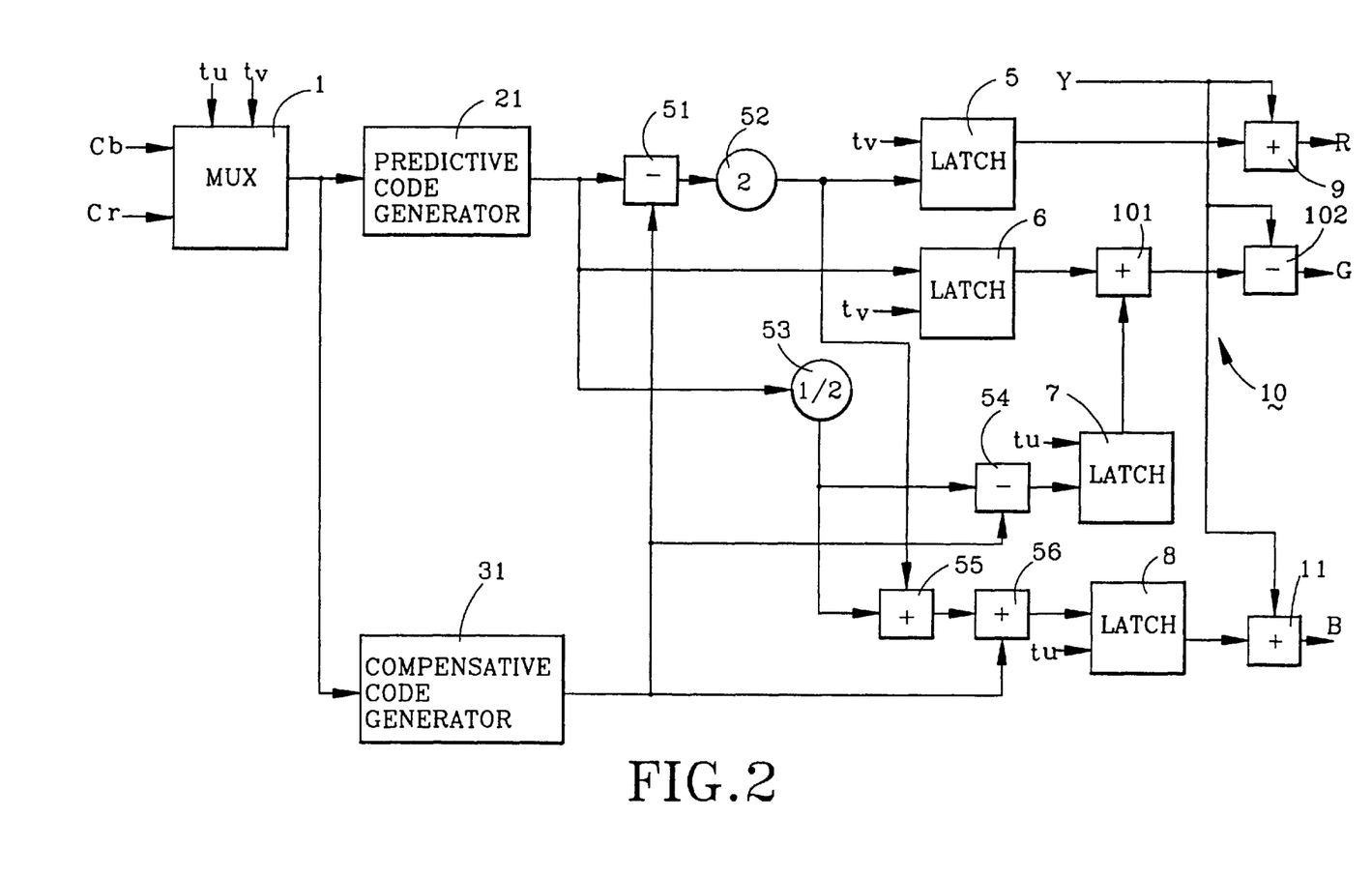
FIG. 2 is a functional block diagram of the second preferred embodiment of a color space converting apparatus according to the present invention.

Referring to FIG. 2, the second preferred embodiment of a color space converting apparatus for converting digitized YCbCr luminance-chrominance color space signals to digitized RGB color space signals in accordance with this invention is shown to comprise a multiplexer 1, a predictive code generator 21, a compensative code generator 31, a linear combining unit which includes a plurality of shifters, adders and subtracters 51, 52, 53, 54, 55, 56, first to fourth latches 5, 6, 7, 8, and first to third output combining units 9, 10, 11.

The second preferred embodiment is essentially similar to the first preferred embodiment. However, in the present embodiment, the predictive transformation codes are formulated as 0.714 (C-128), while the compensative transformation codes remain as 0.013 (C-128), where C represents the Cb chrominance color space signal during the tu timing phases, and the Cr chrominance color space signal during the tv timing phases. In case that U and V are employed instead of Cb and Cr as the input chrominance color space signals, the formulas for the predictive and compensative transformation codes become 0.714C and 0.013C, respectively, where C represents the U chrominance color space signal during the tu timing phases, and the V chrominance color space signal during the tv timing phases.

Therefore, for the second preferred embodiment, the starting chrominance-in-color term 0.714 (Cr-128) need not be expanded since the coefficient thereof is already in terms of the predictive coefficient. Since the coefficients of the starting chrominance-in-color terms 1.402 (Cr-128), 0.344 (Cb-128) and 1.772 (Cb-128) are not equal to the predictive or compensative coefficients, they can be expanded as follows:

1.402 (Cr-128)=2[0.714 (Cr-128)−0.013 (Cr-128)]

0.344 (Cb-128)=½ (0.714 ) (Cb-128)−0.013 (Cb-128)

1.772 (Cb-128)=2[0.714 (Cb-128)−0.013 (Cb-128)]+½ (0.714) (Cb-128)+0.013 (Cb-128)

The linear combining unit combines the predictive and compensative transformation codes from the predictive and compensative code generators 21, 31 according to the above expansion equations to obtain the transformation values for the starting chrominance-in-color terms in the standard set of conversion equations (a.1) to (a.3).

The subtracter 51 subtracts the compensative transformation code outputted by the compensative code generator 31 from the predictive transformation code outputted by the predictive code generator 21. The shifter 52 performs an arithmetic left shift on the output of the subtracter 51 for achieving the function of multiplication by two to obtain the transformation value for the starting chrominance-in-color term 1.402 (Cr-128) during the tv timing phases.

The shifter 53 performs an arithmetic right shift on the predictive transformation code from the predictive code generator 21. The subtracter 54 subtracts the compensative transformation code outputted by the compensative code generator 31 from the output of the shifter 53 to obtain the transformation value for the starting chrominance-in-color term 0.344 (Cb-128) during the tu timing phases.

The adder 55 adds the outputs of the shifters 52, 53. The adder 56 adds the output of the adder 55 and the compensative transformation code from the compensative code generator 31 to obtain the transformation value for the starting chrominance-in-color term 1.772 (Cb-128) during the tu timing phases.

The first latch 5 latches the output of the shifter 52 during the tv timing phases to obtain the desired Cr-in-R transformation value, i.e. 1.402 (Cr-128). The second latch 6 latches the predictive transformation code from the predictive code generator 21 during the tv timing phases to obtain the desired Cr-in-G transformation value, i.e. 0.714 (Cr-128). The third latch 7 latches the output of the subtracter 54 during the tu timing phases to obtain the desired Cb-in-G transformation value, i.e. 0.344 (Cb-128). The fourth latch 8 latches the output of the adder 56 during the tu timing phases to obtain the desired Cb-in-B transformation value, i.e. 1.772 (Cb-128).

The first to third output combining units 9, 10, 11 operate in a manner similar to that of the previous embodiment and will not be described further.

Figure 3:
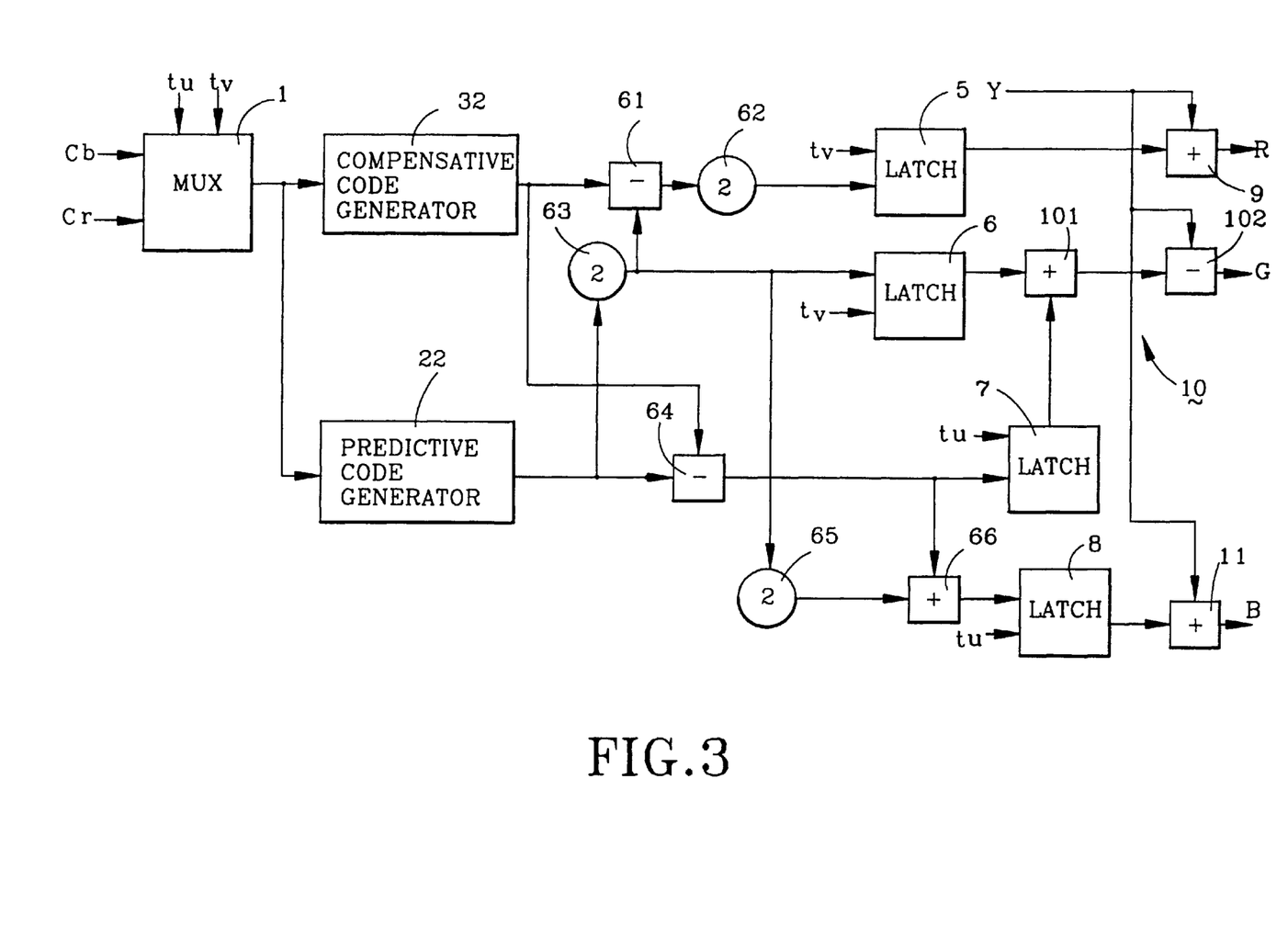
FIG. 3 is a functional block diagram of the third preferred embodiment of a color space converting apparatus according to the present invention.

Referring to FIG. 3, the third preferred embodiment of a color space converting apparatus for converting digitized YCbCr luminance-chrominance color space signals to digitized RGB color space signals in accordance with this invention is shown to comprise a multiplexer 1, a predictive code generator 22, a compensative code generator 32, a linear combining unit which includes a plurality of shifters, adders and subtracters 61, 62, 63, 64, 65, 66, first to fourth latches 5, 6, 7, 8, and first to third output combining units 9, 10, 11.

The third preferred embodiment is essentially similar to the previous embodiments. However, in this embodiment, the predictive transformation codes are formulated as 0.357 (C-128), while the compensative transformation codes remain as 0.013 (C-128), where C represents the Cb chrominance color space signal during the tu timing phases, and the Cr chrominance color space signal during the tv timing phases. In case that U and V are employed instead of Cb and Cr as the input chrominance color space signals, the formulas for the predictive and compensative transformation codes become 0.357C and 0.013C, respectively, where C represents the U chrominance color space signal during the tu timing phases, and the V chrominance color space signal during the tv timing phases.

Therefore, for the third preferred embodiment, the starting chrominance-in-color terms 1.402 (Cr-128), 0.714 (Cr-128), 0.344 (Cb-128) and 1.772 (Cb-128) can be expanded as follows:

0.714 (Cr-128)=2(0.357) (Cr-128)

1.402 (Cr-128)=2[2(0.357) (Cr-128)−0.013 (Cr-128)]

0.344 (Cb-128)=0.357 (Cb-128)−0.013 (Cb-128)

1.772 (Cb-128)=2[2(0.357) (Cb-128)]+0.357 (Cb-128)−0.013 (Cb-128)

The linear combining unit combines linearly the predictive and compensative transformation codes from the predictive and compensative code generators 22, 32 according to the preceding expansion equations to obtain the transformation values for the starting chrominance-in-color terms in the standard set of conversion equations (a.1) to (a.3).

The shifter 63 performs an arithmetic left shift on the predictive transformation code from the predictive code generator 22 to achieve the function of multiplication by 2 in order to obtain the transformation value for the starting chrominance-in-color term 0.714 (Cr-128) during the tv timing phases.

The subtracter 61 subtracts the compensative transformation code outputted by the compensative code generator 32 from the 0.714 (C-128) output of the shifter 63. The shifter 62 performs an arithmetic left shift on the output of the subtracter 61 to obtain the transformation value for the starting chrominance-in-color term 1.402 (Cr-128) during the tv timing phases.

The subtracter 64 subtracts the compensative transformation code outputted by the compensative code generator 32 from the predictive transformation code outputted by the predictive code generator 22 to obtain the transformation value for the starting chrominance-in-color term 0.344 (Cb-128) during the tu timing phases.

The shifter 65 performs an arithmetic left shift on the 0.714 (C-128) output of the shifter 63. The adder 66 adds the outputs of the subtracter 64 and the shifter 65 to obtain the transformation value for the starting chrominance-in-color term 1.772 (Cb-128) during the tu timing phases.

The first latch 5 latches the output of the shifter 62 during the tv timing phases to obtain the desired Cr-in-R transformation value, i.e. 1.402 (Cr-128). The second latch 6 latches the output of the shifter 63 during the tv timing phases to obtain the desired Cr-in-G transformation value, i.e. 0.714 (Cr-128). The third latch 7 latches the output of the subtracter 64 during the tu timing phases to obtain the desired Cb-in-G transformation value, i.e. 0.344 (Cb-128). The fourth latch 8 latches the output of the adder 66 during the tu timing phases to obtain the desired Cb-in-B transformation value, i.e. 1.772 (Cb-128).

The first to third output combining units 9, 10, 11 operate in a manner similar to that of the previous embodiments and will not be described further.

Figure 4:
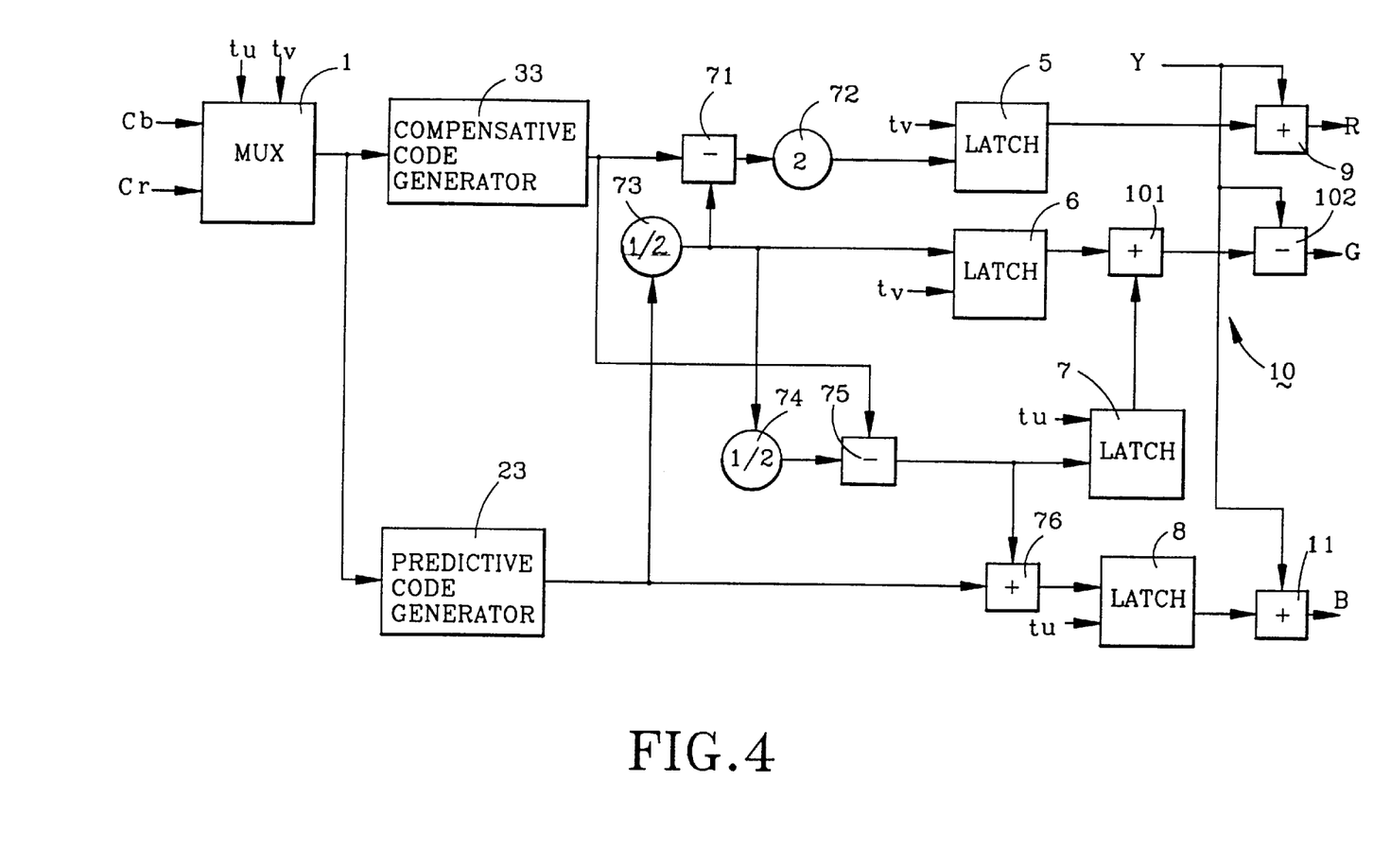
FIG. 4 is a functional block diagram of the fourth preferred embodiment of a color space converting apparatus according to the present invention.

Referring to FIG. 4, the fourth preferred embodiment of a color space converting apparatus for converting digitized YCbCr luminance-chrominance color space signals to digitized RGB color space signals in accordance with this invention is shown to comprise a multiplexer 1, a predictive code generator 23, a compensative code generator 33, a linear combining unit which includes a plurality of shifters, adders and subtracters 71, 72, 73, 74, 75, 76, first to fourth latches 5, 6, 7, 8, and first to third output combining units 9, 10, 11.

The fourth preferred embodiment is essentially similar to the previous embodiments. However, in this embodiment, the predictive transformation codes are formulated as 1.428 (C-128), while the compensative transformation codes remain as 0.013 (C-128), where C represents the Cb chrominance color space signal during the tu timing phases, and the Cr chrominance color space signal during the tv timing phases. In case that U and V are employed instead of Cb and Cr as the input chrominance color space signals, the formulas for the predictive and compensative transformation codes become 1.428C and 0.013C, respectively, where C represents the U chrominance color space signal during the tu timing phases, and the V chrominance color space signal during the tv timing phases.

For the fourth preferred embodiment, the starting chrominance-in-color terms 1.402 (Cr-128), 0.714 (Cr-128), 0.344 (Cb-128) and 1.772 (Cb-128) can be expanded as follows:

1.402 (Cr-128)=2[½(1.428) (Cr-128)−0.013 (Cr-128)]

0.714 (Cr-128)=½(1.428) (Cr-128)

0.344 (Cb-128)=½[½(1.428) (Cb-128)]−0.013 (Cb-128)

1.772 (Cb-128)=1.428 (Cb-128)+½[½(1.428) (Cb-128)]−0.013 (Cb-128)

The linear combining unit combines linearly the predictive and compensative transformation codes from the predictive and compensative code generators 23, 33 according to the foregoing expansion equations to obtain the transformation values for the starting chrominance-in-color terms in the standard set of conversion equations (a.1) to (a.3).

The shifter 73 performs an arithmetic right shift on the predictive transformation code from the predictive code generator 23 to achieve the function of division by 2 in order to obtain the transformation value for the starting chrominance-in-color term 0.714 (Cr-128) during the tv timing phases.

The subtracter 71 subtracts the compensative transformation code outputted by the compensative code generator 33 from the 0.714 (C-128) output of the shifter 73. The shifter 72 performs an arithmetic left shift on the output of the subtracter 71 to obtain the transformation vale for the starting chrominance-in-color term 1.402 (Cr-128) during the tv timing phases.

The shifter 74 performs an arithmetic right shift on the 0.714 (C-128) output of the shifter 73. The subtracter 75 subtracts the compensative transformation code outputted by the compensative code generator 33 from the output of the shifter 74 to obtain the transformation value for the starting chrominance-in-color term 0.344 (Cb-128) during the tu timing phases.

The adder 76 adds the 0.344 (C-128) output of the subtracter 75 to the predictive transformation code from the predictive code generator 23 to obtain the transformation value for the starting chrominance-in-color term 1.772 (Cb-128) during the tu timing phases.

The first latch 5 latches the output of the shifter 72 during the tv timing phases to obtain the desired Cr-in-R transformation value, i.e. 1.402 (Cr-128). The second latch 6 latches the output of the shifter 73 during the tv timing phases to obtain the desired Cr-in-G transformation value, i.e. 0.714 (Cr-128). The third latch 7 latches the output of the subtracter 75 during the tu timing phases to obtain the desired Cb-in-G transformation value, i.e. 0.344 (Cb-128). The fourth latch 8 latches the output of the adder 76 during the tu timing phases to obtain the desired Cb-in-B transformation value, i.e. 1.772 (Cb-128).

The first to third output combining units 9, 10, 11 operate in a manner similar to that of the previous embodiments and will not be described further.

Figure 5:
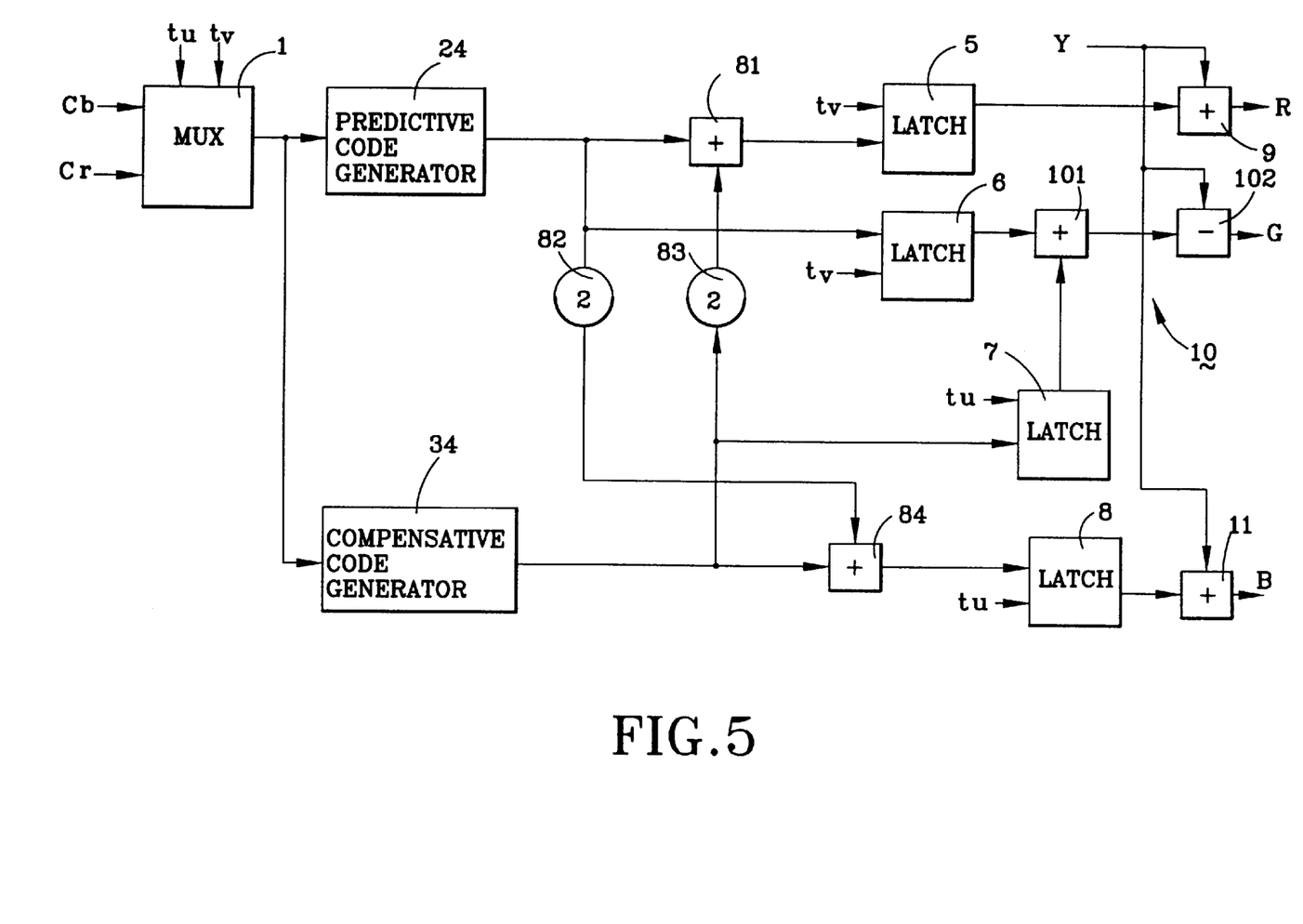
FIG. 5 is a functional block diagram of the fifth preferred embodiment of a color space converting apparatus according to the present invention.

Referring to FIG. 5, the fifth preferred embodiment of a color space converting apparatus for converting digitized YCbCr luminance-chrominance color space signals to digitized RGB color space signals in accordance with this invention is shown to comprise a multiplexer 1, a predictive code generator 24, a compensative code generator 34, a linear combining unit which includes a plurality of shifters and adders 81, 82, 83, 84, first to fourth latches 5, 6, 7, 8, and first to third output combining units 9, 10, 11.

The fifth preferred embodiment is essentially similar to the previous embodiments. However, in the present embodiment, the predictive transformation codes are formulated as 0.714 (C-128), while the compensative transformation codes are formulated as 0.344 (C-128), where C represents the Cb chrominance color space signal during the tu timing phases, and the Cr chrominance color space signal during the tv timing phases. In case that U and V are employed instead of Cb and Cr as the input chrominance color space signals, the formulas for the predictive and compensative transformation codes become 0.714C and 0.344C, respectively, where C represents the U chrominance color space signal during the tu timing phases, and the V chrominance color space signal during the tv timing phases.

Therefore, for the fifth preferred embodiment, the starting chrominance-in-color terms 0.714 (Cr-128) and 0.344 (Cb-128) need not be expanded since the coefficients thereof are equal to the predictive and compensative coefficients. Since the coefficients of the starting chrominance-in-color terms 1.402 (Cr-128) and 1.772 (Cb-128) are not equal to the predictive or compensative coefficients, they can be expanded as follows:

1.402 (Cr-128)=0.714 (Cr-128)+2[0.344 (Cr-128)]

1.772 (Cb-128)=2[0.714 (Cb-128)]+0.344 (Cb-128)

The linear combining unit combines the predictive and compensative transformation codes from the predictive and compensative code generators 24, 34 according to the above expansion equations to obtain the transformation values for the starting chrominance-in-color terms in the standard set of conversion equations (a.1) to (a.3).

The shifter 83 performs an arithmetic left shift on the compensative transformation code from the compensative code generator 34 to multiply the same by a factor of two. The adder 81 adds the output of the shifter 83 to the predictive transformation code from the predictive code generator 24 in order to obtain the transformation value for the starting chrominance-in-color term 1.402 (Cr-128) during the tv timing phases.

The shifter 82 performs an arithmetic left shift on the predictive transformation code from the predictive code generator 24 to multiply the same by a factor of two. The adder 84 adds the output of the shifter 82 to the compensative transformation code from the compensative code generator 34 in order to obtain the transformation value for the starting chrominance-in-color term 1.772 (Cb-128) during the tu timing phases.

The first latch 5 latches the output of the adder 81 during the tv timing phases to obtain the desired Cr-in-R transformation value, i.e. 1.402 (Cr-128). The second latch 6 latches the predictive transformation code from the predictive code generator 24 during the tv timing phases to obtain the desired Cr-in-G transformation value, i.e. 0.714 (Cr-128). The third latch 7 latches the compensative transformation code from the compensative code generator 34 during the tu timing phases to obtain the desired Cb-in-G transformation value, i.e. 0.344 (Cb-128). The fourth latch 8 latches the output of the adder 84 during the tu timing phases to obtain the desired Cb-in-B transformation value, i.e. 1.772 (Cb-128).

The first to third output combining units 9, 10, 11 operate in a manner similar to that of the previous embodiments and will not be described further.

The predictive and compensative code generators of the preceding embodiments are implemented as look-up tables.

Figure 6:
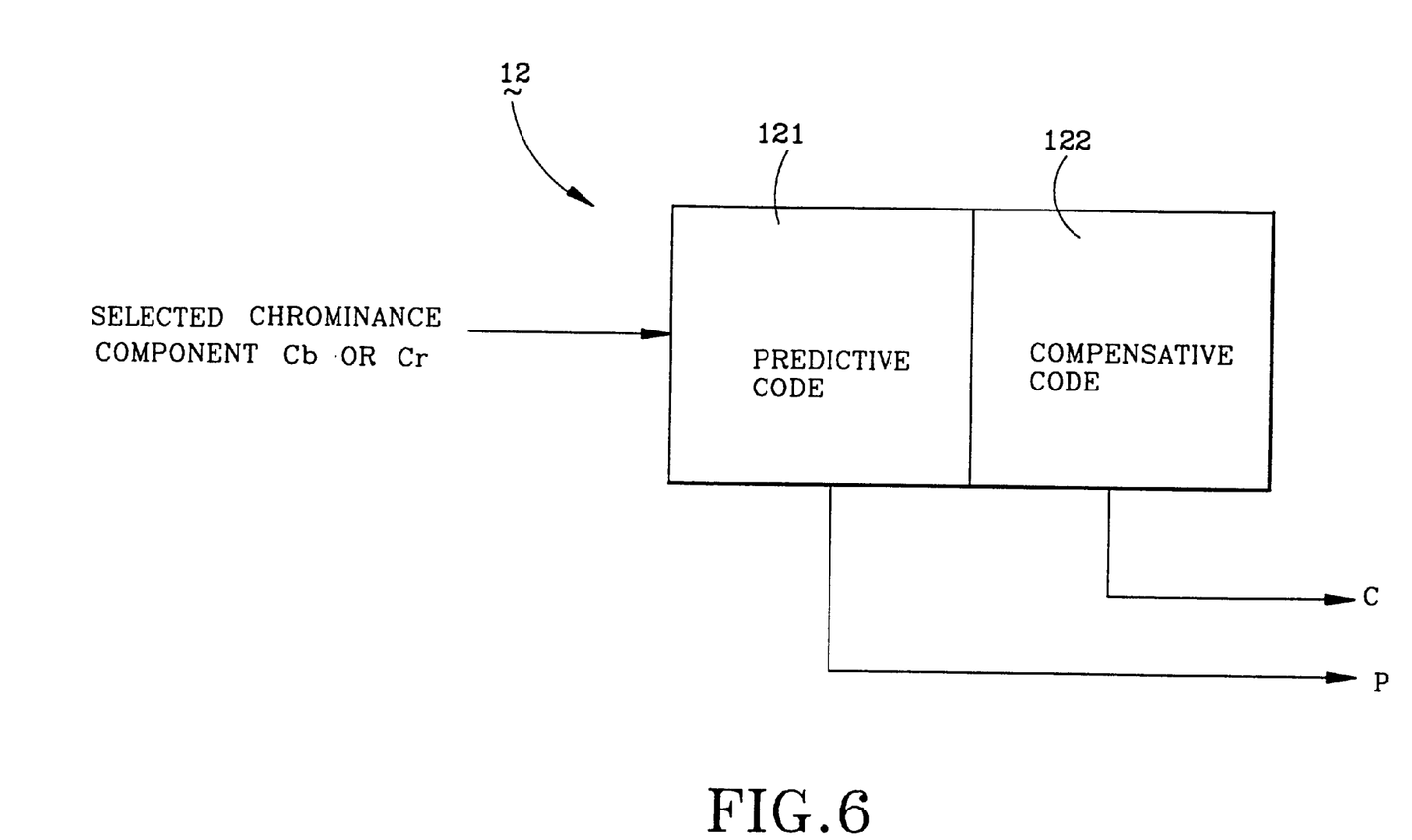
FIG. 6 is a block diagram illustrating the preferred implementation of predictive and compensative code generators for the color space converting apparatus according to the present invention.

Preferably, the predictive and compensative code generators are jointly implemented in a single look-up table unit, such as that shown in FIG. 6, so that implementation of the two code generators involves a simple circuitry, like a memory device, thereby reducing the cost of the color space converting apparatus of this invention.

As shown in FIG. 6, the look-up table unit 12 includes a predictive code portion 121 which contains the predictive transformation codes, and a compensative code portion 122 which contains the compensative transformation codes. When the selected chrominance color space signal Cb or Cr addresses the look-up table unit 12, a corresponding codeword that contains a predictive transformation code from the predictive code portion 121 and a compensative transformation code from the compensative code portion 122 is outputted via first and second outputs (P) and (C) of the look-up table unit 12, whereby the predictive transformation code is provided at the first output (P) while the compensative transformation code is provided at the second output (C).

It should be noted that, although the preferred embodiments are shown as hard-wired blocks in a dedicated hardware circuitry, the present invention may be easily and efficiently implemented by a programmed microprocessor and the associated system memory to perform the calculations of the conversion.

It has thus been shown that, by using shared predictive and compensative transformation codes for the two chrominance color space signals, a cost-effective color space converting method and apparatus for converting digitized luminance-chrominance color space signals to digitized RGB color space signals can be realized. The object of the present invention is thus met.

While the present invention has been described in connection with what is considered the most practical and preferred embodiments, it is understood that this invention is not limited to the disclosed embodiments but is intended to cover various arrangements included within the spirit and scope of the broadest interpretation so as to encompass all such modifications and equivalent arrangements.

I claim:

1. A method for converting digitized luminance-chrominance color space signals to digitized RGB color space signals based on a standard set of conversion equations that involve four starting chrominance-in-color terms, comprising the steps of:

expanding the starting chrominance-in-color terms into linear combinations of expanded chrominance-in-color terms that involve only predictive and compensative coefficients;

providing a predictive code generator for generating predictive transformation codes that correspond to a first one of the chrominance color space signals during a first timing phase and that correspond to a second one of the chrominance color space signals during a second timing phase, and a compensative code generator for generating compensative transformation codes that correspond to the first one of the chrominance color space signals during the first timing phase and that correspond to the second one of the chrominance color space signals during the second timing phase, the predictive and compensative transformation codes being transformation values for the expanded chrominance-in-color terms;

linearly combining the predictive and compensative transformation codes from the predictive and compensative code generators to obtain transformation values for the starting chrominance-in-color terms; and combining the transformation values for the starting chrominance-in-color terms with the luminance color space signal according to the standard set of conversion equations to obtain the RGB color space signals.

2. The method of claim 1, further comprising the step of providing the first one of the chrominance color space signals to the predictive and compensative code generators during the first timing phase, and the second one of the chrominance color space signals to the predictive and compensative code generators during the second timing phase.

3. The method of claim 1, further comprising the step of latching the transformation values for the starting chrominance-in-color terms prior to combining with the luminance color space signal.

4. The method of claim 1, wherein the chrominance color space signals are Cb and Cr color space signals.

5. The method of claim 4, wherein the standard set of conversion equations include:

$R=Y+1.402 \ (Cr\text{-}128)$ $G=Y-0.714 \ (Cr\text{-}128)-0.344 \ (Cb\text{-}128)$ $B=Y+1.772 \ (Cb\text{-}128).$ 6. The method of claim 1, wherein the chrominance color space signals are U and V color space signals.

7. The method of claim 6, wherein the standard set of conversion equations include:

$R=Y+1.402V$ $G=Y-0.714V-0.344U$ $B=Y+1.772U.$

8. The method of claim 1, wherein at least one of the predictive and compensative coefficients is equal to coefficient of one of the starting chrominance-in-color terms.

9. The method of claim 1, wherein the predictive and compensative coefficients are equal to coefficients of two of the starting chrominance-in-color terms.

10. The method of claim 1, wherein at least one of the predictive and compensative code generators is implemented as a look-up table unit.

11. The method of claim 1, wherein the predictive and compensative code generators are jointly implemented in a single look-up table unit.

12. An apparatus for converting digitized luminance-chrominance color space signals to digitized RGB color space signals based on a standard set of conversion equations that involve four starting chrominance-in-color terms, the starting chrominance-in-color terms being expanded into linear combinations of expanded chrominance-in-color terms that involve only predictive and compensative coefficients, said apparatus comprising:

a predictive code generator for generating predictive transformation codes that correspond to a first one of the chrominance color space signals during a first timing phase and that correspond to a second one of the chrominance color space signals during a second timing phase, and a compensative code generator for generating compensative transformation codes that correspond to the first one of the chrominance color space signals during the first timing phase and that correspond to the second one of the chrominance color space signals during the second timing phase, the predictive and compensative transformation codes being transformation values for the expanded chrominance-in-color terms;

linear combining means, connected to said predictive and compensative code generators, for linearly combining the predictive and compensative transformation codes from said predictive and compensative code generators to obtain transformation values for the starting chrominance-in-color terms; and output combining means, connected to said linear combining means, for combining the transformation values for the starting chrominance-in-color terms with the luminance color space signal according to the standard set of conversion equations to obtain the RGB color space signals.

13. The apparatus of claim 12, further comprising multiplexer means, connected to said predictive and compensative code generators, for providing the first one of the chrominance color space signals to said predictive and compensative code generators during the first timing phase, and for providing the second one of the chrominance color space signals to said predictive and compensative code generators during the second timing phase.

14. The apparatus of claim 12, further comprising latch means, connected between said linear combining means and said output combining means, for latching the transformation values for the starting chrominance-in-color terms prior to combining with the luminance color space signal.

15. The apparatus of claim 12, wherein the chrominance color space signals are Cb and Cr color space signals.

16. The apparatus of claim 15, wherein the standard set of conversion equations include:

$$R=Y+1.402 \text{ (Cr-}\mathbf{128})$$

$$G=Y-0.714 \text{ (Cr-}\mathbf{128})-0.344 \text{ (Cb-}\mathbf{128})$$

$$B=Y+1.772 \text{ (Cb-}\mathbf{128}).$$

17. The apparatus of claim 12, wherein the chrominance color space signals are U and V color space signals.

18. The apparatus of claim 17, wherein the standard set of conversion equations include:

$$R=Y+1.402V$$

$$G=Y-0.714V-0.344U$$

$$B=Y+1.772U.$$

19. The apparatus of claim 12, wherein at least one of the predictive and compensative coefficients is equal to coefficient of one of the starting chrominance-in-color terms.

20. The apparatus of claim 12, wherein the predictive and compensative coefficients are equal to coefficients of two of the starting chrominance-in-color terms.

21. The apparatus of claim 12, wherein at least one of said predictive and compensative code generators is implemented as a look-up table unit.

22. The apparatus of claim 12, wherein said predictive and compensative code generators are jointly implemented in a single look-up table unit.

* * * * *